United States Patent
Gerber

(10) Patent No.: US 6,364,579 B1
(45) Date of Patent: Apr. 2, 2002

(54) APPARATUS FOR SEPARATING SUSPENDED FIBROUS MATERIAL

(76) Inventor: Milton L. Gerber, 818 S. Prentiss Bay, P.O. Box 427, Cedarville, MI (US) 49719

(*) Notice: Subject to any disclaimer, the term of this patent is extended or adjusted under 35 U.S.C. 154(b) by 0 days.

(21) Appl. No.: 09/594,473

(22) Filed: Jun. 15, 2000

(51) Int. Cl.[7] .............................................. B56G 53/60
(52) U.S. Cl. ........................ 406/172; 406/28; 406/171
(58) Field of Search ............................... 406/11, 28, 52, 406/157, 163, 168, 171, 172

(56) References Cited

U.S. PATENT DOCUMENTS

| | | | |
|---|---|---|---|
| 4,128,404 A | | 12/1978 | Stamatiou et al. |
| 4,136,911 A | * | 1/1979 | Husges et al. ................ 302/59 |
| 4,447,249 A | | 5/1984 | Kopena |
| 4,492,534 A | | 1/1985 | Miyaki et al. |
| 4,798,516 A | * | 1/1989 | Jagst et al. ............. 415/121 A |
| 5,322,074 A | * | 6/1994 | Cross, Jr. .................... 131/110 |
| 5,403,128 A | * | 4/1995 | Thomas ........................ 406/39 |
| 5,765,728 A | * | 6/1998 | Simpson et al. ......... 222/146.2 |
| 6,089,378 A | * | 9/1998 | Mascheretti et al. ........ 209/143 |
| 5,934,476 A | | 8/1999 | Roe |
| 6,092,747 A | * | 7/2000 | Gerber et al. ................ 241/47 |
| 6,197,080 B1 | * | 3/2001 | Rubenach .................... 55/418 |

* cited by examiner

Primary Examiner—Christopher P. Ellis
Assistant Examiner—Rashmi Sharma
(74) Attorney, Agent, or Firm—George Pappas

(57) ABSTRACT

An apparatus for separating fibrous material such as wool, wood, paper, cellulose, rockwool, fiberglass, etc., which is conveyed by and suspended in air. The separator can be used with pneumatic vacuum systems and pneumatic pressure conveying systems for separating fibrous material used for insulation. The apparatus includes a housing having an inlet, an air outlet and a fibers outlet. An air lock is provided at the fibers outlet for allowing fibrous material to exit but generally restricting the air from exiting therethrough. A screen supported on a support fixture located at the air outlet allows air to pass but generally restricts fibrous material from exiting. The fibrous material is allowed to accumulate on the screen thereby forming a fibrous filter mat for filtering smaller fibrous particles. Scalping blades travel over and at a distance from the screen thereby removing accumulated fibrous material and retaining the fibrous filter mat at a desired thickness for allowing air to pass but filtering smaller fibrous particles. The distance between the screen and scalping blades is selectively adjustable by selectively moving the screen for thereby selectively adjusting the thickness of the filter mat. A pressure transducer senses the differential pressure between the housing and the air outlet and increases the thickness of the filter mat in response to decreasing pressure differential and decreases the thickness of the filter mat in response to increasing differential pressure.

28 Claims, 4 Drawing Sheets

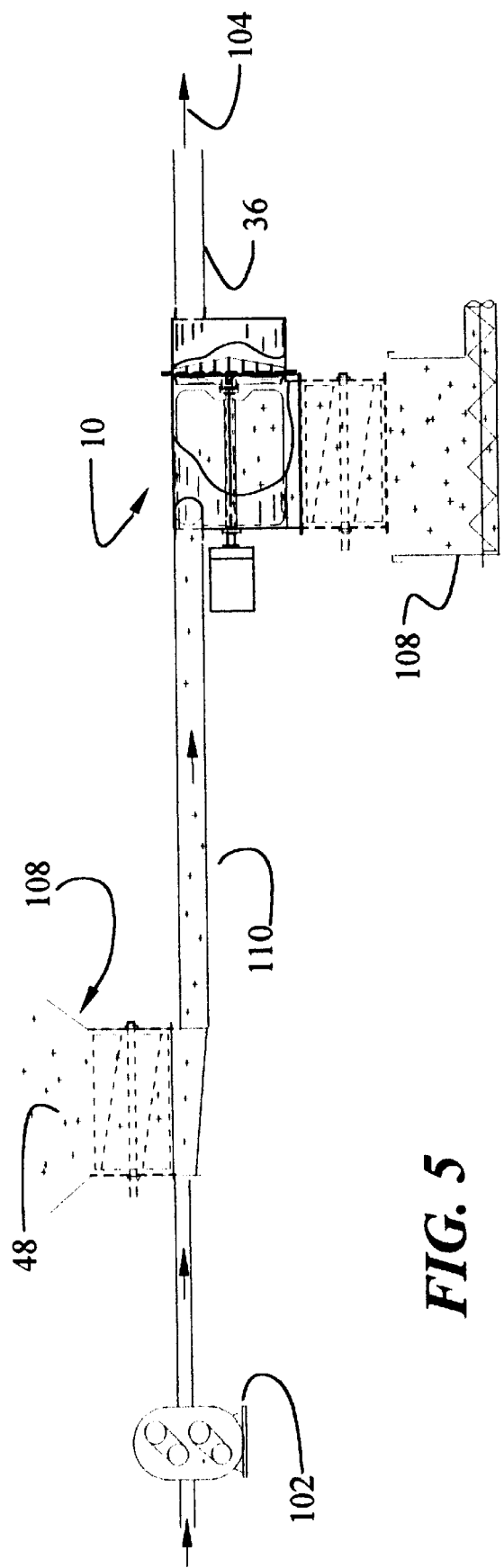

APPARATUS FOR SEPARATING SUSPENDED FIBROUS MATERIAL

TECHNICAL FIELD

The present invention relates to the technical field of transporting and separating fibrous materials used for insulation such as mineral wool, fiberglass and cellulose materials. More particularly, the present invention is directed to an apparatus for separating fibrous material which is suspended and being transported by air.

BACKGROUND OF THE INVENTION

Fibrous materials including mineral wool, fiberglass and cellulose are today commonly used for insulating buildings and homes. The fibrous material is typically conveyed and applied in attics and walls through hoses wherein air travels at a sufficiently high velocity to carry the fibrous material through the hose and to the location being insulated. Essentially, the fibrous material is mixed in or otherwise introduced into the high velocity air traveling through a hose thereby carrying the fibrous material through the hose and to the location being insulated.

When filling vertical stud wall cavities, the conveyed fibrous materials are typically admixed with water and adhesives for creating a solid layer of insulation which is then sprayed between the vertical studs. The resulting rough surface is typically leveled to the stud face and the excess removed material falls to the floor wherefrom it is recovered and reused. It is most efficient to recover the excess fallen fibrous material by vacuum or pressure pneumatic systems and to convey the material directly back to the insulation application machine whereat the recovered fibrous material insulation is typically blended with new insulation.

Prior to reintroducing the recovered fibrous insulation into the insulation application machine, the recovered fibrous insulation must be separated from the air in which it was suspended. Essentially, the fibrous material must be separated from the air stream. Although separators and/or filters have previously been devised for this purpose, they are not without substantial shortcomings and drawbacks. For example, Kopena, U.S. Pat. No. 4,447,249, utilizes a rotating screen that progressively moves the collected material from a high to a low pressure zone for removing the fibrous material from the air stream. However, the rotating screen can not remove all of the fines and additional filtering is required downstream.

Roe, U.S. Pat. No. 5,934,476, utilizes a rotating screen with a plurality of cavities for separating the fibrous materials. Similarly, however, downstream additional filtering is required for removing the finer fibrous materials.

Stamatiou et al., U.S. Pat. No. 4,128,404, describes a cyclone separator having an internal perforated conical screen. Fibrous materials trapped by the screen are cleaned therefrom with rotating air nozzles or wiper blades in sliding contact with the screen. Again, the separator does not remove the finer fibrous particles and additional separation and filtering is required downstream.

Accordingly, a need exists for a separator capable of separating fibrous materials being carried by and suspended in air effectively and efficiently, and also removing substantially most of the finer fibrous particles thereby generally eliminating the need for additional downstream filtering.

SUMMARY OF THE INVENTION

It is the principal object of the present invention to overcome the above-discussed disadvantages associated with prior fibrous material separators.

It is an object of this invention to provide a compact, efficient method and apparatus for removing fibrous materials such as wool, paper, insulation, synthetic fibers from vacuum or pressure pneumatic conveying systems without the need for additional downstream conveying filtration.

It is a further object of this invention that part of the material being conveyed be continually retained and utilized as a highly efficient filtering media for the conveying air or gases.

It is a further object of this invention to provide an adjustable rotating screeding device to control the thickness of the retained fibrous media that serves as a filter.

It is a further object of this invention to provide an automatic device to control the thickness of the retained fibrous media.

The present invention overcomes the disadvantages associated with prior separators by providing a housing having an inlet for receiving the air and the fibrous material suspended therein, an air outlet and a fibers outlet. A screen is provided at the housing air outlet for allowing air to pass but generally restricting the fibrous material from exiting therethrough. The air and fibrous material entering the housing inlet are at a higher pressure than the air outlet thereby causing the air to flow therethrough, and also thereby accumulating fibrous material on the screen as the air passes therethrough. The housing preferably includes a cylindrical wall portion and rotating vanes therein located between the housing inlet and the fibers outlet. The rotating vanes have peripheral edges traveling adjacent the housing inner cylindrical wall thereby generally restricting air flow from the housing inlet to the fibers outlet. Therefore, substantially all the air is forced to exit the housing through the screen.

A scalping blade is provided which is adapted to travel over and at a desired distance from the screen. As air exits through the air outlet and fibrous material accumulates on the screen, the fibrous material which accumulates beyond the desired distance from the screen is removed therefrom by the scalping blade and falls by gravity through the fibers exit. However, fibrous material accumulated on the screen between the scalping blade and the screen, remains on the screen thereby forming a fibrous filter mat whereby smaller fibrous material and particles are effectively filtered and separated from the air exiting through the air outlet.

Preferably, the air outlet and screen are located at one longitudinal end of a housing cylindrical wall and the scalping blade extends radially from a rotating shaft extending longitudinally therein. Yet more preferably, a pressure differential transducer is provided for comparing the pressures in the housing and at the air outlet and selectively energizing an actuator for moving the screen and decreasing the distance between the screen and scalping blade in response to increasing pressure differential and, for increasing the distance between the screen and scalping blade in response to decreasing pressure differential.

The air is conveyed through the housing inlet and out through the air outlet preferably by either connecting a vacuum hose to the inlet and connecting the air outlet to a vacuum pump or, in the alternative, connecting the housing inlet directly to a pneumatic pressure conveying system.

In one form thereof, the present invention is directed to an apparatus for separating fibrous material suspended in air. The apparatus includes a housing having an inlet for receiving the air and fibrous material suspended therein, an air outlet, and a fibers outlet. A screen is provided at the housing air outlet for allowing air to pass but generally restricting the fibrous material from exiting therethrough. The air and fibrous material entering the inlet are at a higher pressure than the air outlet thereby accumulating fibrous material on the screen as air passes therethrough. Rotating vanes are provided in the housing between the inlet and the fibers outlet generally restricting air from exiting through the fibers outlet. A scalping blade is adapted to travel over and at a distance from the screen. Fibrous material accumulated on the screen beyond that distance is removed from the screen by the scalping blade and fall through the fibers exit. The fibrous material between the scalping blade and the screen remains on the screen thereby forming a fibrous filter mat whereby smaller fibrous material can be filtered and separated from the air.

In one form thereof, the present invention is directed to an apparatus for separating fibrous material suspended in air. The apparatus includes a housing having an inlet for receiving the air and fibrous material, an air outlet, and a fibers outlet. A screen is provided at the housing air outlet for allowing air to pass, but generally restricting fibrous material from exiting therethrough. The air and fibrous material entering the inlet are at a higher pressure than the air outlet thereby accumulating fibrous material on the screen as air passes therethrough. A scalping blade is provided and is adapted to travel over and at a distance from the screen. Fibrous material accumulated on the screen beyond that distance is removed from the screen by the scalping blade, and fibrous material between the scalping blade and the screen remains on the screen forming a fibrous filter mat whereby smaller fibrous material can be filtered and accumulated. An air lock is provided at the fibers outlet allowing fibrous material to exit but generally restricting air from exiting therethrough.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

Figure 1:
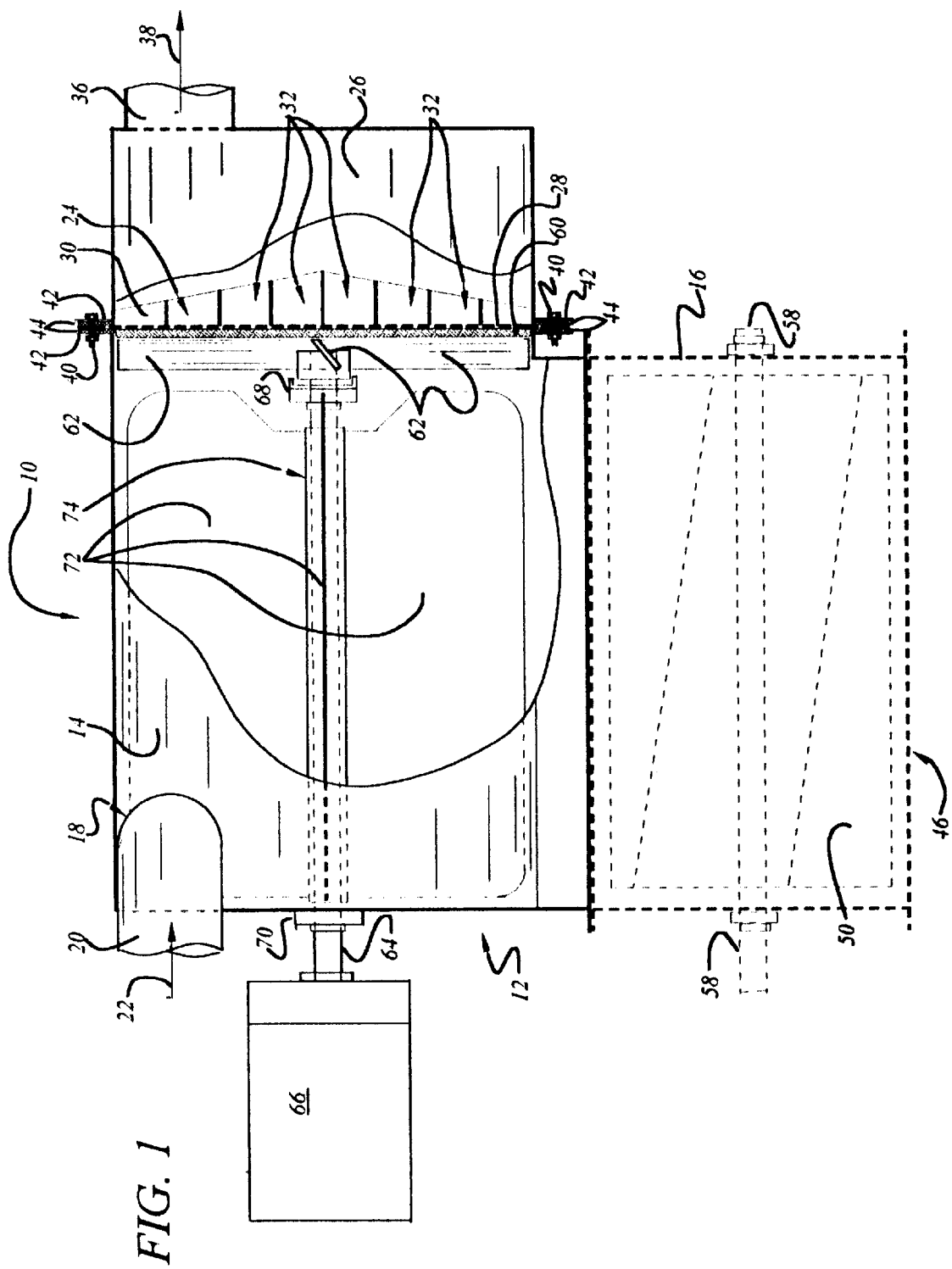
FIG. 1 is a side elevation diagrammatic view, partially in section, of an apparatus for separating fibrous material constructed in accordance with the principles of the present invention.

Referring initially to FIG. 1, there is shown and generally designated by the numeral 10, an apparatus for separating fibrous material which is conveyed by and suspended in air. Apparatus 10 includes a housing 12 which is preferably made up of a generally cylindrical distribution section 14 communicating with an air lock section 16. It is noted that, although the distribution section 14 and the air lock section 16 are depicted as separate inner connected units, it is contemplated that housing 12 can be a single unitary housing merely incorporating the functions of the distribution and airlock sections as described herein.

Housing 12 includes an inlet 18 whereat an inlet or vacuum hose 20 is connected. Fibrous material suspended in air is conveyed through the hose 20 and inlet opening 18, as depicted by arrow 22, into the distribution section 14 of housing 12. It is noted that, as used herein, "air" is intended to mean one or more gases including atmospheric gases commonly referred to as "air".

Housing 12 includes an air outlet 24 at one longitudinal end of the cylindrically shaped distribution section 14. Air outlet 24 is thus preferably disk shaped and leads to the cylindrically shaped air accumulation section 26. A screen 28 is provided at the air outlet 24 leading to the air accumulation section 26. Screen 28 includes openings which are smaller than most, but not all, of the fibrous particles to be separated from the conveying air. In the embodiment of FIG. 1, a support grid 30 having a plurality of openings 32 and being generally disk shaped is affixed in the air accumulation section 26 adjacent the air outlet 24. Support grid 30, thus, supports the screen 28 and prevents it from collapsing into the air accumulation section 26 as air travels from within the distribution section 14, through screen 28 and into the accumulation section 26. An air outlet hose 36 is connected to and communicates with the air accumulation section 26 for directing and allowing fibrous free air to exit therethrough as depicted by arrow 38. It is noted that the air distribution section 14 and the air accumulation section 26 are preferably attached together with bolts 40 extending through respective annular collars 42. Annular gaskets 44 are provided between collars 42 and sandwich the outer perimeter of screen 28, thereby retaining screen 28 and providing a seal between the distribution section 14 and the accumulation section 26.

Figures 2, 3:
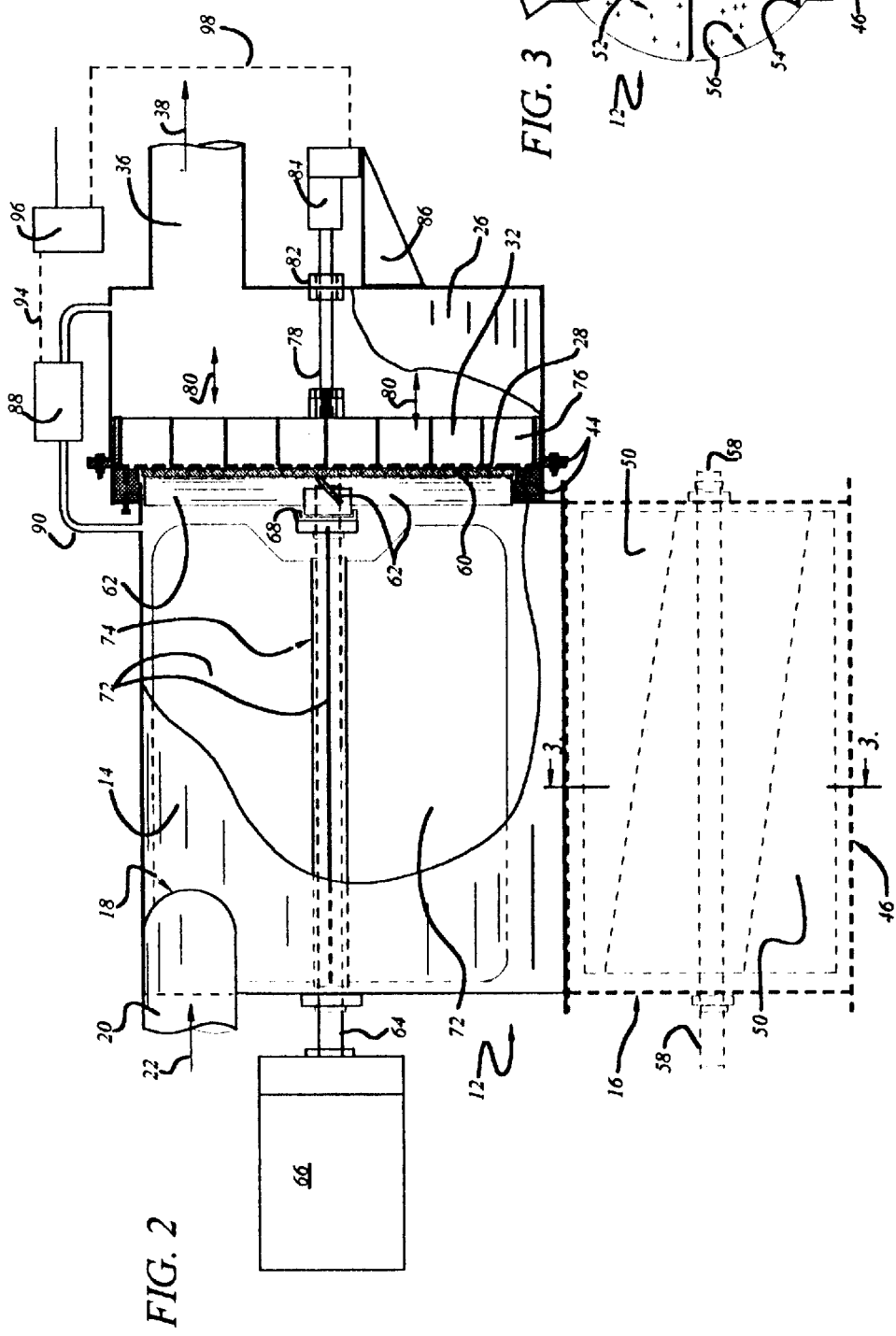
FIG. 2 is a side elevation diagrammatic view, partially in section, similar to FIG. 1, but further depicting automatic actuation and control of the fiber mat thickness in accordance with the principles of the present invention.
FIG. 3 is a cross section view taken generally along line 3—3 in FIG. 2.
Figure 4:
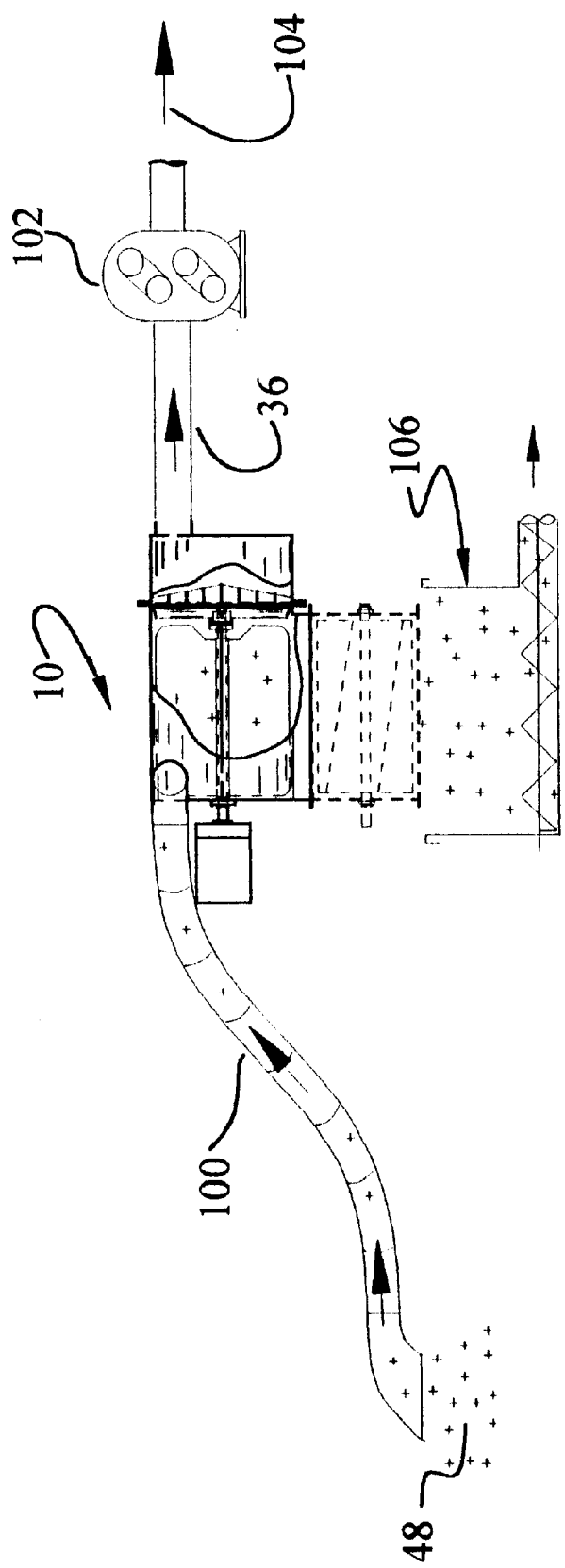
FIG. 4 is a diagrammatic view showing the separating apparatus used in a pneumatic vacuum system in accordance with the principles of the present invention; and, FIG. 5 is a diagrammatic view showing the separating apparatus used in a pneumatic pressure conveying system in accordance with the principles of the present invention.

Housing 12 further includes a fibers outlet 46 whereat the fibrous materials 48 such as, wool, wood, paper, insulation, synthetic fibers, rockwool, fiberglass, etc., may exit as depicted in FIGS. 3–5. The air lock section 16 operates similar to the air lock described in applicant's co-pending U.S. application Ser. No. 09/022,946 for allowing the fibrous material 48 to exit through the fibers outlet 46, but generally restricting air from exiting therethrough. More specifically, the air lock section 16 includes rotating vanes 50 adapted to rotate, as depicted by arrow 52, with their peripheral edges 54 traveling adjacent and preferably in contact with the air lock section cylindrical walls 56. As best seen in FIGS. 3–5, fibrous material 48 which falls gravitationally downwardly into the air lock section 16 continues therethrough as the rotating vanes 50 are rotated therein by a motor drive (not shown) coupled to the center shaft 58. As vanes 50 turn within the air lock section 16, a relatively small amount of air exits therethrough but is insignificant compared to the volume of air traveling through screen 28 and air outlet 24.

In general, the air and fibrous material entering inlet 18 are at a higher pressure than that of the air outlet 24 leading to the air accumulation section 26. Therefore, the high pressure air within the distribution section 14 is forced to travel through screen 28 and air outlet 24 to the air accumulation section 26. Fibrous material suspended and being conveyed by the air thus hits the screen 28 whereat it is accumulated forming a fibrous filter mat 60 on top of and along screen 28. As fibrous material enters the distribution section 14 through inlet 18, the heaviest fibrous particles will tend to fall by gravity toward the air lock section 16 and outlet 46 prior to reaching screen 28. This, in part, is in view of the decrease in air velocity caused as a result of the larger volume of the distribution section 14 compared to the volume of inlet hose 20. The fibrous particles which remain suspended are carried to screen 28 and, thus, accumulate thereon and create the filter mat 60. Very importantly, the filter mat 60 is not removed from screen 28 but, rather, is retained thereon and the thickness thereof is controlled for allowing air to pass therethrough and the screen while capturing the yet smaller fibrous particles which would not ordinarily be captured by screen 28. In this manner, the fibrous material 48 creates its own filter mat 60 for efficiently and effectively filtering yet smaller fibrous particles.

To prevent the over-accumulation of fibrous material on screen 28 and the clogging of air outlet 24, separating apparatus 10 includes a plurality of scalping blades 62 adapted to travel over at a distance from screen 28 for scraping away over-accumulated unwanted fibrous material, but leaving a filter mat layer 60 on screen 28 for continuously filtering the smaller fibrous particles. As seen in FIG. 1, scalping blades 62 are attached to and extend radially outwardly from shaft 64 which extends longitudinally within the cylindrical distribution section 14. Shaft 64 is driven by a gear motor 66. Shaft 64 is supported within the distribution section 14 by an internally supported bracket 68 at one longitudinal end, and bearing member 70 at the other longitudinal end. Scalping blades 62 are, thus, adapted to rotate and travel over, preferably at a distance of 1/16 to 1 inch, from screen 28. This distance establishes the thickness of the filter mat 60. As scalping blades 62 are rotated over screen 28, fibrous material 48 accumulated on the screen 28 beyond this distance is removed from screen 28 and, in view of their accumulated weight, falls downwardly through the air lock section 16 and out through the fibers outlet 46. However, fibrous material 48 between the scalping blades 62 and screen 28 remains on the screen 28 forming the fibrous filter mat 60. The smaller fibrous material or particles are filtered and separated by this filter mat 60 while air is allowed to travel therethrough and screen 28 and out through the air outlet into the air accumulation section 26.

For further increasing the efficiency of the separating apparatus 10, a plurality of distribution vanes 72 are attached to a hub 74 which, in turn, is carried and driven by the shaft 64. Distribution vanes 72 are, thus, rotated along with and at the same speed as the scalping blades 62 by gear motor 66. As fibrous material 48 is conveyed to the distribution section 14 through inlet 18, the rotating distribution vanes 72 tend to force the suspended fibrous material radially outwardly whereat some fibers effectively coagulate and fall to the air lock section 16 without ever reaching screen 28 or filter mat 60. More importantly, however, the distribution vanes 72 cause the lighter smaller fibrous particles to be more evenly distributed on screen 28 and filter mat 60 as they are pulled toward screen 28 by the air moving therethrough to the accumulation section 26. In this manner, the smaller fibrous particles are more evenly distributed and efficiently filtered generally along the entire surface of the filter mat 60 and screen 28.

Referring now more particularly to FIG. 2, there is shown an embodiment wherein the distance between the scalping blades 62 and screen 28 is selectively adjustable and controlled thereby selectively also adjusting and controlling the thickness of filter mat 60. As shown, in this embodiment a support fixture or grid 76 is not affixed to the accumulation section but, rather, is supported on a shaft 78 which is longitudinally movable within the cylindrical accumulation section 26 as indicated by double arrow 80. Here, the accumulation section 26 is attached to the distribution section 14 with a gasket. However, screen 28 is attached to and is carried by support fixture 76 so as to move longitudinally therewith. Shaft 78 extends through a seal 82 and is connected to an actuator 84 supported on a bracket 86. Actuator 84 is adapted to slidingly longitudinally move shaft 78 and thereby selectively move or adjust the support fixture 76 and screen 28 longitudinally as depicted by double arrow 80. In this manner, the distance between screen 28 and the scalping blades 62 and the thickness of filter mat 60 is effectively adjusted.

Actuator 84 is controlled by providing a pressure differential transducer 88 connected to and sensing the pressure in the distribution section 14 through air tube 90 and connected and sensing the pressure within the air accumulation section 26 through an air tube 92. Pressure differential transducer 88 provides a process variable signal 94 representing the pressure differential between the distribution section 14 and the air accumulation section 26 or air outlet 24. A set point controller 96 is provided and receives the process variable signal 94 and provides a corrective signal 98 to actuator 84 for thereby selectively adjusting the distance between screen 28 and scalping blades 62. More particularly, screen 28 is adjusted and moved toward scalping blades 62 for decreasing the distance between the screen 28 and scalping blades 62 in response to an increasing pressure differential signal 94, and for moving screen 28 away from scalping blades 62 and thereby increasing the distance between screen 28 and scalping blades 62 in response to a decreasing pressure differential signal 94. Thus, as the filter mat 60 becomes too dense or otherwise too thick thereby restricting air flow, the pressure differential increases and the screen is adjusted for decreasing the distance between the screen 28 and scalping blades 62 and decreasing the thickness of the filter mat. However, a decrease in pressure differential causes adjustment of screen 28 for increasing the distance from the scalping blades 62 and thereby also increasing the thickness of the filter mat 60.

Preferably the distance between the screen 28 and scalping blades 62 is adjusted to a distance and, thus, filter mat thickness of 1/16 inch to 1 inch. As can be appreciated, depending on the type and size of the fibrous material being separated, the thickness of the filter mat 60 is selectively adjusted for maximizing air flow and filtering and separating the smaller fibrous particles thereby essentially eliminating the need for downstream additional filtering of the air. It is further noted that, although it is preferred to move and adjust screen 28 and support fixture 76, it is contemplated that the screen 28 and fixture 76 can be fixed and the scalping blades 62 and/or shaft 74 can be made selectively longitudinally movable for adjusting the distance between the scalping blades 62 and screen 28 and, thus, the thickness of filter mat 60.

FIGS. 4 and 5 depict two possible system uses of the separating apparatus 10. In FIG. 4, inlet 18 is attached to a vacuum hose 100 and the air outlet is attached to a blower 102. Thus, fibrous material 48 is sucked up through the vacuum hose 100 into the separator apparatus 10 whereat the air is separated and travels through the outlet hose 36 and blower 102 to the atmosphere as depicted by arrow 104. Fibrous material which is separated from the air, drops downwardly to a feeder 106 whereat it is accumulated and/or transferred for use in other processes.

In the system depicted in FIG. 5, a feeder 108 introduces fibrous material 48 into a conveying hose 110. A blower 102 forces air into the conveying hose 110 for effectively conveying the fibrous material 48 therethrough over a desired distance whereat the separator apparatus 10 then may separate the fibrous material. Clean air exits out through outlet hose 36 as depicted by arrow 104. Again, fibrous material separated from the air drops into a feeder 106 whereat it is accumulated and/or otherwise transported for use in other processes.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An apparatus for separating fibrous material conveyed by and suspended in air, said apparatus comprising:
    a housing having an inlet for receiving the air and fibrous material suspended therein, an air outlet, and a fibers outlet;
    a screen at said housing air outlet allowing air to pass but generally restricting the fibrous material from exiting therethrough;
    wherein the air and the fibrous material entering said inlet are at a higher pressure than said air outlet thereby accumulating fibrous material on said screen as air passes therethrough;
    rotating vanes between said inlet and said fibers outlet generally restricting air from exiting through said fibers outlet;
    a scalping blade adapted to travel over and at a distance from said screen; and,
    wherein fibrous material accumulated on said screen beyond said distance is removed from said screen by said scalping blade and fall through said fibers outlet, and fibrous material between said scalping blade and said screen remains on said screen forming a fibrous filter mat whereby smaller fibrous material can be filtered and separated from the air.

2. The apparatus of claim 1 wherein said housing includes an inner partially cylindrical air lock wall, said rotating vanes having peripheral edges traveling adjacent said housing air lock wall, whereby air flow is restricted from said inlet to said fibers outlet.

3. The apparatus of claim 2 further comprising rotating distribution vanes in a generally cylindrical distribution section, wherein said air outlet and screen are located at a longitudinal end of said housing distribution section and said scalping blade rotates with said distribution vanes.

4. The apparatus of claim 3 wherein said distance between said screen and scalping blade is selectively adjustable.

5. The apparatus of claim 3 wherein said screen is supported on a support fixture, said support fixture being selectively movable for adjusting the distance between said screen and scalping blade.

6. The apparatus of claim 5 further comprising an actuator coupled to and adapted to selectively move said support fixture thereby selectively adjusting the distance between said screen and scalping blade.

7. The apparatus of claim 6 further comprising a pressure differential transducer, and wherein the pressures in said housing and at said outlet are compared and said screen is moved for decreasing the distance between the screen and scalping blade in response to increasing pressure differential and for increasing the distance between said screen and scalping blade in response to decreasing pressure differential.

8. The apparatus of claim 3 further comprising an actuator coupled to and adapted to selectively move said screen thereby selectively adjusting the distance between said screen and scalping blade.

9. The apparatus of claim 8 further comprising a pressure differential transducer, and wherein the pressures in said housing and at said outlet are compared and said screen is moved for decreasing the distance between the screen and scalping blade in response to increasing pressure differential and for increasing the distance between said screen and scalping blade in response to decreasing pressure differential.

10. The apparatus of claim 9 wherein said inlet is connected to a vacuum hose and said air outlet is connected to a vacuum pump.

11. The apparatus of claim 9 wherein said inlet is connected to a pneumatic pressure conveying system.

12. The apparatus of claim 1 wherein said distance between said screen and scalping blade is selectively adjustable.

13. The apparatus of claim 1 further comprising an actuator coupled to and adapted to selectively move said screen thereby selectively adjusting the distance between said screen and scalping blade.

14. The apparatus of claim 13 further comprising a pressure differential transducer, and wherein the pressures in said housing and at said outlet are compared and said screen is moved for decreasing the distance between said screen and scalping blade in response to increasing pressure differential and for increasing the distance between the screen and scalping blade in response to decreasing pressure differential.

15. The apparatus of claim 1 wherein said screen is supported on a support fixture, said support fixture being selectively movable for adjusting the distance between said screen and scalping blade.

16. The apparatus of claim 1 wherein said inlet is connected to a vacuum hose and said air outlet is connected to a vacuum pump.

17. The apparatus of claim 1 wherein said inlet is connected to a pneumatic pressure conveying system.

18. The apparatus of claim 1 further comprising means for moving said screen and selectively increasing or decreasing said distance between said screen and scalping blade.

19. An apparatus for separating fibrous material conveyed by and suspended in air, said apparatus comprising:
    a housing having an inlet for receiving the air and fibrous material, an air outlet, and a fibers outlet;
    a screen at said housing air outlet allowing air to pass but generally restricting fibrous material from exiting therethrough;
    wherein the air and fibrous material entering said inlet are at a higher pressure than said air outlet thereby accumulating fibrous material on said screen as air passes therethrough;
    a scalping blade adapted to travel over and at a distance from said screen;
    wherein fibrous material accumulated on said screen beyond said distance is removed from said screen by said scalping blade and fibrous material between said scalping blade and screen remains on said screen forming a fibrous filter mat, whereby smaller fibrous material can be filtered and accumulated; and, an airlock at said fibers outlet allowing fibrous material to exit but generally restricting air from exiting therethrough.

20. The apparatus of claim 19 wherein said distance between said screen and scalping blade is selectively adjustable.

21. The apparatus of claim 19 wherein said screen is supported on a support fixture, said support fixture being selectively movable for adjusting the distance between said screen and scalping blade.

22. The apparatus of claim 19 further comprising an actuator coupled to and adapted to selectively move said support fixture thereby selectively adjusting the distance between said screen and scalping blade.

23. The apparatus of claim 22 further comprising a pressure differential transducer, and wherein the pressures in said housing and at said outlet are compared and said screen is moved for decreasing the distance between the screen and scalping blade in response to increasing pressure differential and for increasing the distance between said screen and scalping blade in response to decreasing pressure differential.

24. The apparatus of claim 23 wherein said inlet is connected to a pneumatic pressure conveying system.

25. The apparatus of claim 23 wherein said distance between said screen and scalping blade is selectively adjustable.

26. The apparatus of claim 19 wherein said inlet is connected to a pneumatic pressure conveying system.

27. The apparatus of claim 19 wherein said distance between said screen and scalping blade is selectively adjustable.

28. The apparatus of claim 19 further comprising means for moving said screen and selectively increasing or decreasing said distance between said screen and scalping blade.

* * * * *